March 8, 1966  H. REIBER ETAL  3,238,749
SERIES FLASH DEVICE AND METHOD OF MANUFACTURE THEREOF
Filed June 30, 1961  3 Sheets-Sheet 1

INVENTORS
Hans Reiber
Karl Herrmann
Alois Ziegler
By Howard P. King
ATTORNEY

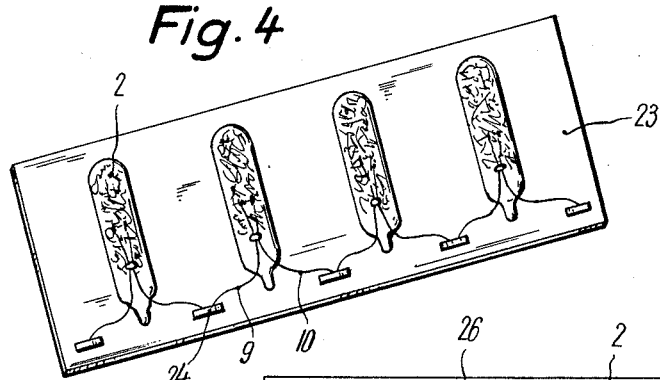
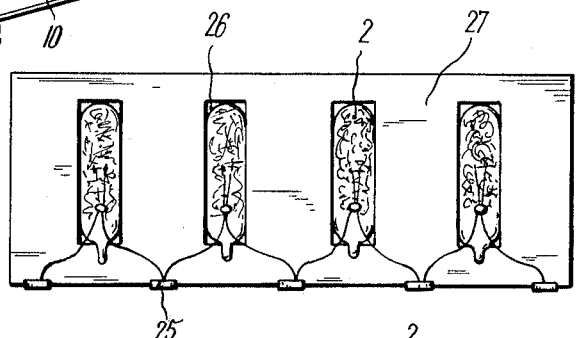
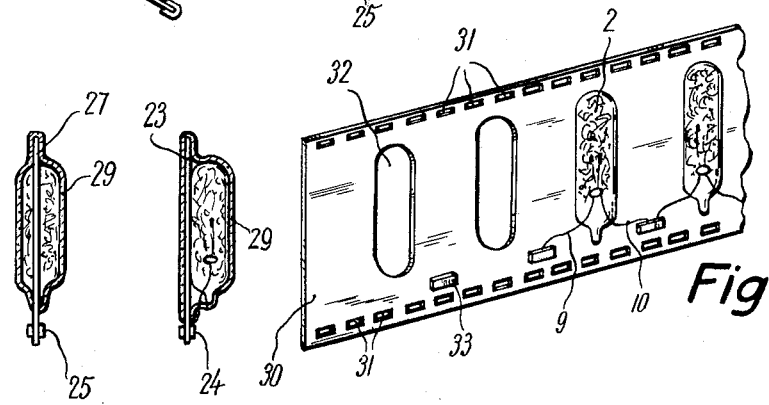
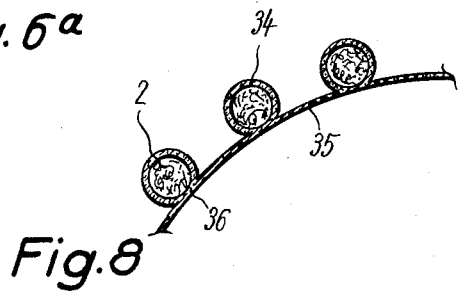

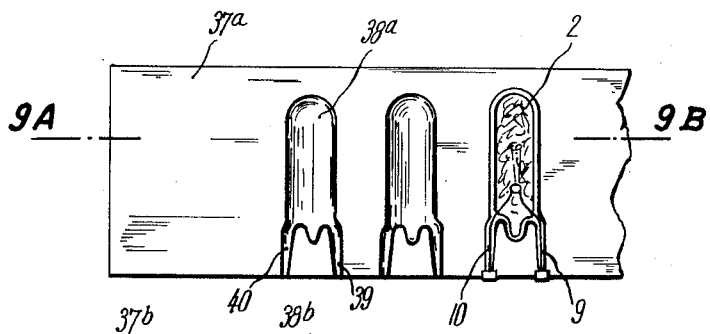
Fig. 9
Fig. 9b
Fig. 9a
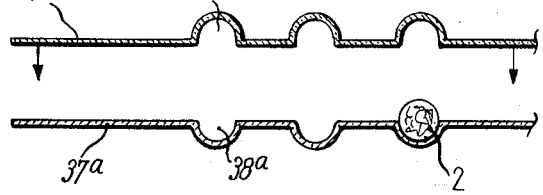
Fig. 10
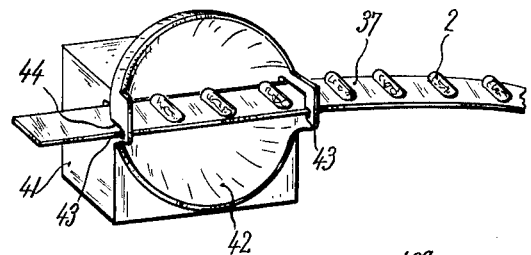
Fig. 11
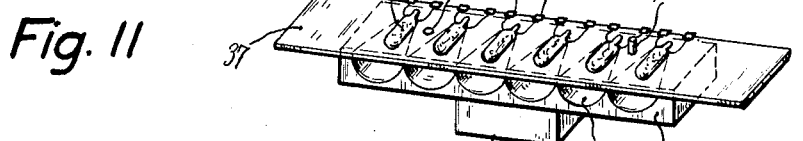
Fig. 12
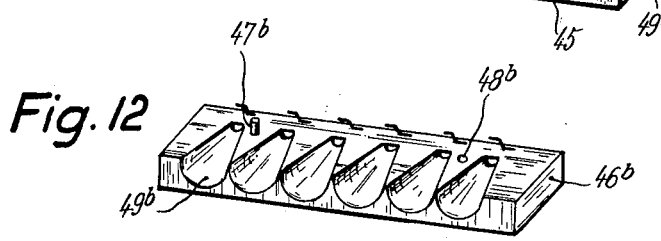

United States Patent Office 3,238,749
Patented Mar. 8, 1966

3,238,749
SERIES FLASH DEVICE AND METHOD OF
MANUFACTURE THEREOF
Hans Reiber, Karl Herrmann, and Alois Ziegler, all of Augsburg, Germany, assignors to Patent-Treuhand-Gesellschaft für Electrische Glühlampen m.b.H., Munich, Germany
Filed June 30, 1961, Ser. No. 122,062
Claims priority, application Germany, July 4, 1960, P 25,286
4 Claims. (Cl. 67—31)

The present invention relates to a series flash device, and more particularly to a magazine mechanism inclusive of a plurality of photoflash lamps incorporated as part therewith.

It has been usual hitherto to provide a plurality of sockets, or other holders, each to receive an individual photoflash lamp, and after the lamps are used they are removed individually from the sockets and new ones introduced. The construction of such prior art multiple flush devices is too bulky and the transporting of a plurality of such loaded devices, from consideration of both bulk and weight, impractical and prohibitive. Obviously the removal of burnt lamps, unwrapping and inserting new ones in the heretofore known constructions is time-consuming and necessitates handling each bulb at least twice and individually. A newly flashed lamp is very hot and handling thereof has to be delayed until it cools somewhat. In consequence of the handicaps above mentioned, photographers must often let good photographs slip in cases of quickly varying motifs. The need for and provision of an inexpensive, convenient and rapidly replaceable magazine mechanism has awaited the present invention.

Broadly stated, therefore, the primary object of the present invention is to provide a photoflash lamp magazine mechanism which overcomes the defects and undesirable necessities of the prior art concepts.

More specifically, the present invention proposes a series flash device of minimum bulk and wherein the flashlamps are incorporated as an integral part of the mechanism ready for prompt use individually and successively.

It is an object of the present invention to provide a mechanism inclusive of a mounting and a plurality of flashlamps fully constituted as a unit, capable of such economic manufacture that the unit may be thrown away in its entirety when the lamps have all been used.

The invention features the provision of a structure devoid of complicated mechanisms, one which is inexpensive, reliable in operation and quickly replaceable when its lamps have been flashed.

A further object of the invention is to provide a magazine construction which is light in weight and of minimum bulk to enable a goodly quantity of the same to be conveniently carried, and also to enable immediate disposition of the magazine when the last lamp therein has been flashed without any delay for a cooling-off period.

Other objects, advantages and structural features of the invention will become apparent to persons skilled in the art to which it appertains as the description proceeds, both by direct recitation thereof and by implication from the context.

In its general aspects, the invention provides a body portion constituted as a strip-shaped base or insertion piece, and a plurality of flashlamps. The term "base" means in this connection an arrangement serving as mechanical holding means for, and common to all of, the flashlamps. The base has, simultaneously, the second function of accomplishing successively electrical circuit connection for flashing a lamp at a proper moment, and in the preferred embodiment when the lamp is rightly positioned with respect to the camera-mounted reflector and carrying casing of said reflector. Ordinarily the base is self-supporting but flexible and electrically non-conductive. It thus enables contact for each flashlamp to be located thereon in the vicinity of each lamp which may be accomplished by connecting the lead-in wire to a metallic member embedded in the base, or by bending the lead-in wires from the lamp over the edge or rim of the base, supplemented, if desired, by a metallic member or clip pinched onto the said edge and wire.

The several flashlamps, their lead-in wires and contacts are permanent parts with said base, being assembled therewith in course of manufacture and are not removed or detached therefrom either during use or after the lamps have been flashed. Said flashlamps are individually baseless, are preferably of miniature type and are permanently carried at evenly spaced intervals along said body or strip.

The present invention is particularly advantageous for tubular baseless midget photoflash lamps having a bulb volume below 5 cm.$^3$, preferably of 0.75 cm.$^3$ to 2.5 cm.$^3$ and by which losses are avoided by absence of light-absorbing base parts or dead space. These baseless midget photoflash lamps are filled with oxygen of about five to nine atmospheres. The combustible material may appropriately consist of finely distributed zirconium, aluminum, magnesium or alloys thereof in the form of wire, tape, foils or preferably shredded foils of irregular cross-section of an average thickness or breadth respectively of about twelve to thirty microns.

The flashlamps may have any desired fixed relationship to the common base, for instance, they may stand axially perpendicular to said base, or if preferred, may lie axially parallel to said base. In this latter instance, the lamps may be each framed within cut-outs in the base, or located in pre-formed hollows of the base, or located in superposed position of rest upon the flat surface of said base, or otherwise as found most desirable. The base may conveniently be utilized as part or all of the packing provided for shipment of the lamps and sale to the customer. It is also to be noted that in all instances of mounting the flashlamps on the common base, that some spacing is provided between successive lamps to prevent any sympathetic ignition. Such spacing is preferably at least equal to the diameter of the flashlamps, and by virtue of such spacing it is also possible to pack two of the magazine units together with the lamps of one unit projecting between the lamps of the other unit in up-side-down relation.

The flash device of the present invention is used with an appropriate open-front casing within which is a reflector, the casing having diametrically opposite openings in its sides to permit transverse passage of the flash device therethrough with said openings having side notches for guiding said device to move only in a longitudinal direction. Means functioning as electrical brushes are provided for making electrical contact with the lead-in wires for which-ever lamp is located at flashing position within said casing in front of said reflector. Said brushes form part of a circuit which is under switch control by the user so that the rightly positioned lamp may be flashed at his will and pleasure.

The flash device is appropriately mounted to be movable with successive steps crosswise of the casing and suitably guided to position one flashlamp at a time at the proper flashing position. Guiding by said notches is such that the only permitted movement of the device in use is in a longitudinal direction thereof through the casing. Spring actuation of the brushes, or other locating means, may be employed for the temporary location and retention of the device at each proper position of rest, or "on" position of the brushes in contact with the wires or contact members on the base as each lamp arrives at its flashing position. If desired, a spring-pressed ball may ride against said base and seat in a locating socket therefor in the base when the base arrives at the proper position for flashing each lamp.

It is deemed within the scope of the invention to utilize the flash device with or without a slide bar for its support, but in either event, the guiding effected will limit freedom of movement to a longitudinal direction of the flash device body, and if a bar is employed suitable means will be provided to locate the said body at precise position on the bar and the intermittent stop means for locating the device properly in flashing position will be effective on said bar.

In association with the present invention, it has been found that small reflecting surfaces constitute good reflectors with high amplification factors and with a very uniform illumination of the object plane. These reflectors, of which, for example, five to twelve may be employed, may be comprehended by a compact unit in a flash device, having, for instance truncated cone shape or truncated pyramid shape, wherein the greater diameter amounts to about two to two and a half times the lamp diameter and having a length about the same as the lamp length or a little greater than the lamp length. The reflecting surfaces may be made of any desired material, or may be provided with a colored coating of high reflecting power. The flash device may be sprayed with synthetic resin colored white in the mass, such as with an aerated plastic.

Referring to the accompanying drawings, in which like numerals of reference indicate similar parts throughout the several views;

FIGURE 4 is a perspective view of a flashing device wherein the lamps are applied to the base with the axes of the flashlamps parallel to the plane of said base;

FIGURE 5 is a plan of a base having cut-outs receiving and framing the flashlamps;

FIGURE 5a is an end edge view of the flashing device of FIG. 5;

FIGURE 6 is an end edge view similar to FIG. 5a and showing a lacquer coating applied to the flashing device;

FIGURE 6a is an end edge view of the device of FIG. 4 and showing a lacquer coating thereon.

FIGURE 7 is a perspective view of a partially completed flashing device and showing margin perforations for actuation of the device by a toothed wheel (not shown);

FIGURE 8 is a longitudinal sectional view of a portion of a flashing device showing self-supporting flexibility of a base of synthetic material and showing the flashlamps welded thereto by means of their protective shrouds of synthetic resin, lacquer or the like;

FIGURE 9 shows a base having hollows for the lamp and a lamp located in one of said hollows, said base being of synthetic transparent material with one layer behind the lamp and another layer in front of the lamp;

FIGURES 9a and 9b show longitudinal sectional views on line 9A–9B of FIG. 9, of the front and back layers respectively;

FIGURE 10 is a perspective view similar to FIG. 2, but showing the flashlamps located with their axes parallel to the plane of the base, exemplifying use of the completed device of FIG. 9;

FIGURE 11 is a perspective view of a flashing device utilizing a plurality of reflectors, one for each flashlamp with one reflector part in position under the base; and FIGURE 12 is a perspective view of the other reflector part to be applied on the top of the base of FIG. 11.

Figure 1:
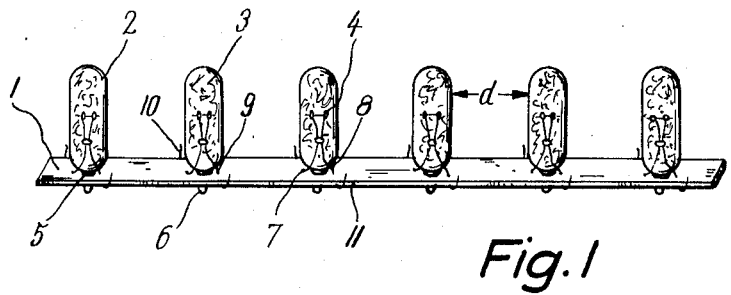
FIGURE 1 is a perspective view of the flashing device of the present invention showing a plurality of flash lamps incorporated as permanent parts with a strip-like base common to all of said lamps.

In the specific embodiment of the invention illustrated in said drawings, and referring initially to the representation thereof in FIG. 1, reference numeral 1 indicates a body portion in the form of an elongated strip and designated herein as a common base for a plurality of baseless photoflash lamps 2. Said base 1 may be of a suitable material of inexpensive character, such as cardboard, plastic or other manufactured or natural product which is preferably non-conductive to electrical currents and self sustaining, although capable of some flexing.

The photoflash lamps 2, besides being individually baseless, are preferably of the midget type with elongated bulbs with a pinched seal at one end known in the trade as an exhaust tip 6. Each such lamps contains a combustible material 3, examples of which are above recited, and each lamp is supplied with an oxygen atmosphere. The photoflash lamp is adapted to be ignited across a primer 4 carried by an igniting wire within the bulb, said primer appropriately comprising zirconium, magnesium, potassium perchlorate or lead dioxide. In order to prevent shattering of the bulb on ignition of the flashing material, the lamps 2 are provided with a coating, either inside or outside or both inside and outside, which is ordinarily colorless but if preferred, may have a desired color such as white or blue. Circuit connection to the primer 4 is provided by in-leads 9, 10 which pass through the bulb to the exterior thereof at the sealed end of the bulb.

Figure 2:
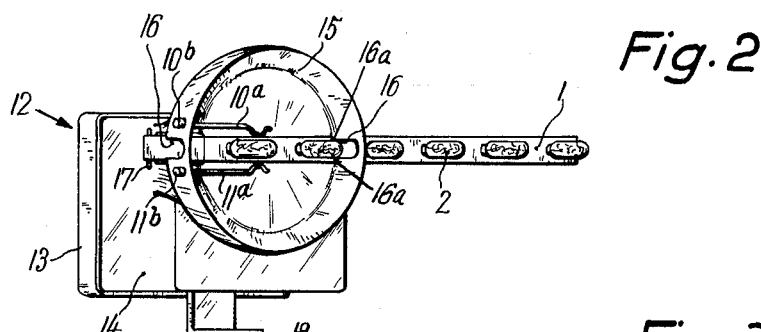
FIGURE 2 is a perspective view of the flashing device of FIG. 1, located in position of use in a reflector casing.
Figure 3:
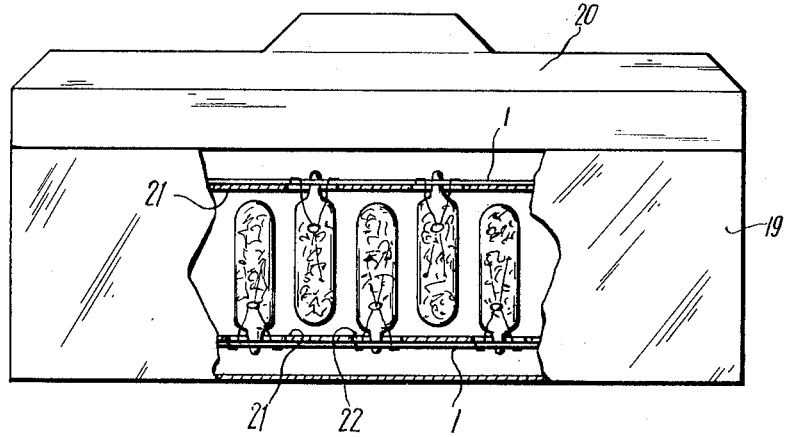
FIGURE 3 is an elevational view of a packing arrangement for two of the flashing devices of FIG. 1.

The strip base 1 in the arrangements shown in FIGS. 1, 2 and 3, has the flashlamps mounted axially perpendicular to the plane of said base. To provide for such mounting, holes 5 are pre-formed in the base at regular intervals into which the exhaust tips 6 of the bulb can be frictionally inserted and retained. The holes 5 are spaced considerably apart so that the successive lamps along the base will be far enough away from each other to avoid sympathy ignition of one from another. Such spacing is preferably somewhat in excess of the distance which might be occupied by another bulb, which is also advantageous for packing purposes as illustrated in FIG. 3. Proximate to each of said holes 5 are two other but smaller holes or perforations 7 and 8 in said base through which the in-lead wires 9 and 10 may be drawn, thereby also assisting in keeping the bulb seated in the tip-receiving holes 5. After passing through said perforations, the in-lead wires are drawn to the side edges of the strip base, bent upwardly thereat and over the top margin of the base and clamped fast thereto. It will be observed that one in-lead 9 is located at one side edge of the base, and the other in-lead 10 is at the other side of the base. In this embodiment of the present invention the current in-leads 9 and 10 arranged and attached as aforesaid constitute the contact members for closing the internal lamp circuit with an electrical external circuit by way of suitable brushes 10a and 10b engaging the contact members when the lamp served thereby is in its proper flashing position. Terminals 10b and 11b connect the brushes to the battery circuit. Said flash device is accordingly a unitary structure of elongated base common to and incorporating therewith a plurality of flashlamps at spaced intervals and likewise providing contact members by which current may be applied to each lamp individually as required in use.

A means and manner of use of the flash device of this invention is illustrated in FIG. 2 wherein a housing 12 is shown with a cover 13 for containing a source of electrical energy, such as dry-cells or batteries (not shown). In conjunction with said housing 12 a casing is provided, open at its front and with a reflector 15 therein facing forwardly. An L-bracket 18 is shown for mounting the housing and casing on a camera. The reflector may be made with a diffusively reflecting coating of high reflecting power of, for example, a synthetic material with an inherently high reflecting surface. It will be understood that the reflector may constitute the inner surface of the casing if so desired whereby the casing functions both as an enclosure and as a reflector. The casing, as well as the entire housing may conveniently be made of synthetic material. The side walls of the casing are provided with diametrically opposite slits 16 to permit introduction and longitudinal movement of the flashing device transversely of the casing reflector so as to successively locate one lamp at a time in proper flashing position in front of the middle of the reflector. Notches 16a at edges of said slits retain said base in sliding position. If desired, a supporting bar 17 may be provided for the sliding passage of the base 1 through the casing. Such bar will provide depth therein to accommodate the exhaust tips 6 and are constructed to avoid electrical short circuiting of the in-lead wires 9, 10 which may be accomplished by use of insulative material composing the bar or by provision of appropriate hollows in said bar avoiding contact of the bar with said wires.

The flash device, in its passage through casing 14 is guided so as to have only longitudinal movement, and appropriate means are provided for temporarily stopping that movement each time the device arrives at proper flashing position for a lamp. This may be accomplished by spring pressure of the brushes on the contact members or by a spring-pressed ball seating in a prepared socket in the base or bar at each registering location. When the lamp is flashed, it is very hot, but no delay need be experienced in sliding the device to the next lamp location until all lamps have been used, at which time the user can grip the base without having to touch the hot lamp, and remove the entire device quickly and insert a fresh one from some such package as shown in FIG. 3, without delay.

As may be seen in FIG. 3, the base 1 of the flash device constitutes some part of a photoflash lamp packing. A flat folding box 19 is provided on both of its longer sides with folding covers 20 and with shelf-like straps 21 which are interrupted at regular intervals, corresponding to the spacing of the lamps on base 1, by recesses 22. The several lamps on said base are inserted through said recesses and the base is brought into juxtaposition to said strap with the exhaust tips toward the proximate cover 20 and the bulbs projecting into the container between the shelf-like straps 21. The strap recesses are arranged so that lamps introduced through one strap will be interposed between lamps introduced through the other strap. Folding the covers down of course keeps the flash devices in place until wanted for use. Devices having lamps that have been flashed may of course be returned as a unit into the box very readily for ultimate disposal when and where convenient.

According to the showings in FIGS. 4, 6a and 8, the flashlamps 2, instead of being secured in perpendicular relation to the base, may be secured horizontally thereto, that is, with the axes of the lamps parallel to the proximate surface of the base upon which the lamp rests. In FIGS. 4 and 6a, the base 23 is shown as a plain strip of cardboard or of synthetic material which may be made reflective in suitable manner, either as an inherent characteristic or by application of reflective material thereon such as a reflective foil. The lamps may be adhered to the base by lacquer of transparent character which will not interfere with passage of light when the lamp is flashed. The in-leads for the several lamps are secured to or by contact members 24 shown on the face of the common base for all of the lamps.

If so desired, instead of having the lamps entirely at one surface of the common base, cut-outs 26 to receive and frame the several lamps may be made in a common base 27 as shown in FIGS. 5, 5a and 6. Furthermore, as shown in FIGS. 5 and 5a, contact members 25 may be provided at an edge of the common base 27 and pinched onto the margin of the base and onto the ends of the in-lead wires. It is also advantageous in this construction to form the base from a transparent material in order to promote useful reflection from a reflector behind the lamp flashed.

The showing in FIG. 7 corresponds in general to the showing of FIGS. 5, 5a and 6, in that a common base 30 is provided having cut-outs 32 to receive and frame the lamps. Contact members 33 for the in-leads 9 and 10 are shown in this view on the face of the base, corresponding to the disclosure of FIG. 4. The distinctive feature of FIG. 7 is the provision of longitudinal series of perforations 31 of the nature of rack teeth by which the base may be moved longitudinally by a toothed wheel engaging with said perforations.

A special advantage of the arrangements shown in FIGS. 4 to 7 resides in the fact that the flashlamps 2 do not have to be individually coated with lacquer, but instead, the assembled lamps on the base are coated as a complete unit with lacquer by a dipping process with the base fed as a continuous tape into the dipping tank and severed thereafter into convenient lengths. As the lamps are placed on the tape prior to its entry into the tank, they will be in adhered condition thereon as the tape emerges from the tank. Application of lacquer to the contact members is either avoided or the lacquer removed therefrom. The lacquer coating 29 thus applied by dipping the assembly protects the lamps against shattering in use and also constitutes means for retaining the lamps permanently secured to the base of the flash device.

A further embodiment of the invention is shown in FIG. 8, wherein each photoflash lamp 2 is first individually covered with a shroud 34 of synthetic resin or is rolled up in a corresponding strip section and the longitudinal seam welded by use of a heated electrode. Then the artificial foil is heated at its open ends until the synthetic material melts down onto the ends of the lamp to constitute a complete shroud 34 around the entire lamp. Then the lamps are positioned on and welded to a foil tape 35 of synthetic material in spaced sequence and heated with an electrode whereby the material of the foil combines with the shroud 34 on the lamp at their areas of contact 36. Polyethylene has proven very suitable as the material for the shroud 34 as well as for the foil strip and when the assembly is occomplished said strip functions as the common base for the photoflash lamps permanently secured thereon. The polyethylene is adequately transparent to pass the light produced when the lamp is flashed. It is also very flexible, and enables the assembly to be wound very easily with a small radius of curvature on a drum and fed therefrom into the reflector casing to position one lamp at a time where it is to be flashed.

Another embodiment of the invention is illustrated in FIGS. 9, 9a, 9b and 10, which may be described as comprising a pair of strips 37a and 37b oppositely moulded with hollows 38a and 38b of reverse order so that when the strips are juxtaposed the pairs of moulded hollows will contain a lamp fitting therein. The strips are of plastic, transparent synthetic material and when placed together with the lamps in the pairs of hollows obtain an embedding of the lamps which are thereby completely enclosed with a shroud of synthetic material so that special individual lacquering of the lamps becomes unnecessary. In moulding the strips, passages 39 and 40 from the hollows are provided at one end of each to the side edge of the strip for receiving the in-lead wires to the lamp. After loading the lamps and juxaposing the strips, the strips are cemented or welded together and together constitute a unified common base 37 for all of the lamps for use in a reflector container 42 shown in FIG. 10 at the front of a battery housing 41. Openings 44 are shown in the side wall of said container admitting passage of thickened portions of the base 37 occasioned by the lamp-receiving hollows, and the ends of openings provide guiding notches 43 for the edge thereat of said base to restrain the base from movement other than longitudinally. As explained in describing FIG. 2, similar choice of means may likewise be here employed for locating the lamps at proper flashing position and to provide electrical contact to the in-lead wires from the battery, as well as provision of desired flashing from shutter operation and advancing means for thereafter moving the next lamp into its flashing position.

Such a synthetic pair of sealed together strips 37a and 37b constituting a common base 37 mounting a series of lamps 2 completely enclosed therein represents an insertion piece or magazine whereby a flash device is provided having the inherent functions of a magazine charge, of serving as its own packing, of being self sustaining in use, and providing a full enclosure for the lamps rendering lacquering of the lamps unnecessary.

Generally, a distance of the photoflash lamps from each other of at least double the bulb diameter is sufficient to prevent sympathy ignition. It is, however, in many cases also possible to choose a somewhat shorter distance, which must not be less than, but preferably somewhat greater than $2r(\sqrt{3}-1)$ where $r$ means the radius of the single photoflash lamp. Such a distance is shown between lamps in FIG. 9.

A magazine arrangement of photoflash lamps having a shorter spacing from each other has been found practical by inclusion of a considerable barrier of nonconductive therebetween. Thus, a series of photoflash lamps which are at quite close spacing may be sprayed with transparent thermoplastic synthetic material which is built up to occupy the space between the lamps in the form of a block, the in-leads of course being brought to the edge of the block for contact purposes as the block is slid through a reflector casing. The block can be readily notched in the nature of a rack for engagement by a toothed wheel for moving it longitudinally from one proper flashing position to another. Such a block shaped structure of flash device constitutes its own packing, and is also advantageous for display and sale in automatic and coin-operated dispensers, having the advantage of being readily stacked therein.

FIG. 11 shows another series flash device comprising a housing 45 in which is located a current source, and two parts 46a and 46b which may be connected with each other in juxtaposed relation by fastening means 47a and 47b as well as 48a and 48b in such a manner that the recesses 49a and 49b together constitute a truncated cone reflector. A multiple lamp flash device including a common base 37 as heretofore described in connection with FIG. 9, is located between said reflector-forming parts 46a and 46b and is secured by means of the fasteners 47a and 47b. The little contact members 50 and 51 clamped with the current in-leads 9 and 10 and fixed on the strip or base 37 are in position to be engaged by brushes (not shown) to a current source in a circuit which includes a switch controlled in conjunction with operation of the camera shutter, or otherwise.

We claim:
1. A series flash device comprising a strip constituting a common base with longitudinal edges and a face intervening between said edges for receiving a plurality of flash lamps, and a plurality of axially elongated baseless midget photoflash lamps with the lamp axes in parallelism to each other and to said face and axially perpendicular to said longitudinal edges of said common base, said lamps each having a less length than the distance between said edges of the base and with both ends of each lamp spaced inwardly from said edges thereby providing longitudinal flat margins at both edges of the common base beyond the ends of the lamps by which the base may be guided and held in use, said lamps having current in-leads directed toward one of said longitudinal edges of the common base, and said base having contact members at a said flat margin thereof, and said in-leads having electrical continuity with said contact members.

2. A series flash device in accordance with claim 1 wherein a common base is provided comprising two strips with hollows of reverse order juxtaposed to each other with the hollows corresponding in juxtaposed pairs to the shape of the lamps in their entireties, and said lamps located in said hollows being wholly enclosed by said base.

3. A series flash device in accordance with claim 1 wherein said common base is provided with openings the periphery of each of which has a contour corresponding to the longitudinal shape of the lamp located therein, and wherein said lamps are located in said openings and framed by said common base with the said periphery of each said opening in an axial and diametric plane of the respective lamp in said opening.

4. A flash device comprising a strip constituting a common base with longitudinal edges and a face intervening between said edges for receiving a plurality of flash lamps, and a plurality of axially elongated baseless photoflash lamps with the lamp axes in parallelism to each other and to said face and axially perpendicular to said longitudinal edges of said common base, said lamps each having a length less than the distance between said edges of the base with both ends of each lamp spaced inwardly from said edges thereby providing longitudinal flat margins at both edges of the common base beyond the ends of the lamps by which the base may be guided and held in use, said lamps having current-in leads directed toward one of said longitudinal edges of the common base, said base having contact members thereon adjacent said one edge, and said current-in leads having electrical continuity with said contact members.

References Cited by the Examiner
UNITED STATES PATENTS

| | | | |
|---|---|---|---|
| 2,422,428 | 6/1947 | Madsick | 240—37 X |
| 2,427,736 | 9/1947 | Noel | 67—31 |
| 2,599,710 | 6/1952 | Hathaway | 339—17 X |
| 2,741,411 | 4/1956 | Olden | 240—1.3 X |
| 2,835,787 | 5/1958 | Mihalyi | 240—1.3 |
| 2,839,667 | 6/1958 | Canella | 240—1.3 |
| 2,852,134 | 9/1958 | Werner | 67—31 X |
| 2,858,515 | 10/1958 | Thunander et al. | 339—17 |
| 2,864,938 | 12/1958 | Shaw et al. | 240—1.3 |
| 2,981,088 | 4/1961 | Kaprelian | 67—31 |
| 2,993,188 | 7/1961 | Anderson | 339—17 X |
| 3,003,053 | 10/1961 | Brooks et al. | 240—1.3 |
| 3,014,122 | 12/1961 | Hornack | 240—1.3 |
| 3,089,951 | 5/1963 | Baldwin | 240—7.1 |

NORTON ANSHER, *Primary Examiner.*